UNITED STATES PATENT OFFICE.

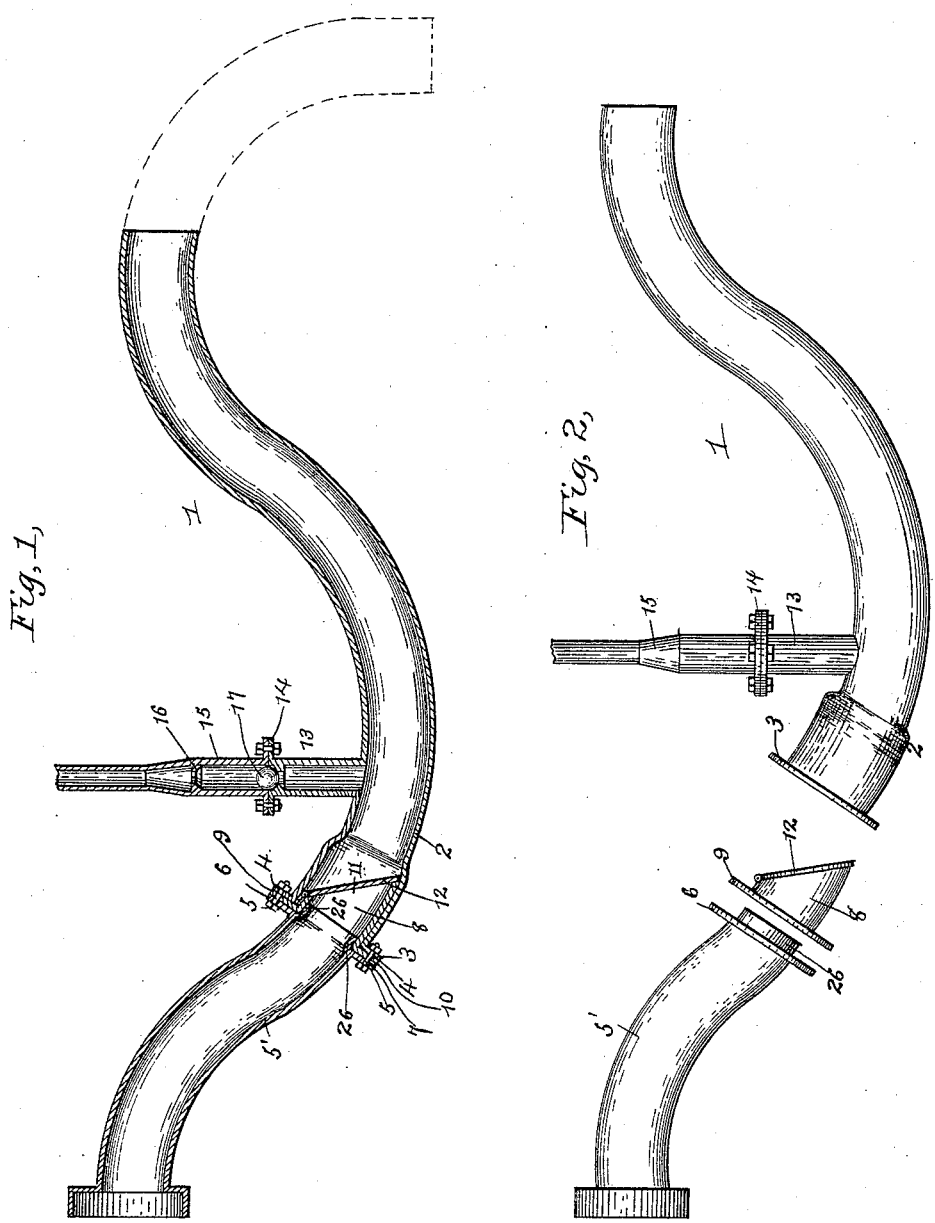

FREDERICK DUANE CROWNER, OF CANTON, NEW YORK.

DRAIN-TRAP.

SPECIFICATION forming part of Letters Patent No. 441,751, dated December 2, 1890.

Application filed June 28, 1890. Serial No. 357,093. (No model.)

*To all whom it may concern:*

Be it known that I, FREDERICK DUANE CROWNER, a citizen of the United States, residing at Canton, in the county of St. Lawrence and State of New York, have invented a new and useful Drain-Trap, of which the following is a specification.

This invention relates to traps for sewers or drains, and it has for its object to construct a device of this class which shall be simple, durable, and inexpensive, and which shall absolutely prevent sewer-gas or backwater from passing through the trap.

With these ends in view the invention consists in the improved construction, arrangement, and combination of parts, which will be hereinafter fully described, and particularly pointed out in the claims.

In the drawings hereto annexed, Figure 1 is a longitudinal sectional view of a trap embodying my improvements. Fig. 2 is a side view showing the several parts of which the trap is composed separated from each other.

Like numerals of reference indicate like parts in both figures.

The trap to which my improvement is applied may be either an ordinary U-trap, or it may be what is known as an "S-trap." In the drawings, hereto annexed, the former has been shown at 1; but I have shown in dotted lines an extension thereof, which would convert it into an S-trap. The inlet branch 2 of the trap is provided with a flange 3, having perforations 4 to receive bolts 5, by means of which it may be connected with the valve-section, which is to be presently described, and with the inlet-pipe 5', which is likewise provided with a flange 6, having perforations 7. The said inlet-pipe may be curved or bent in any desired direction to enable the necessary connections to be made.

8 designates the valve-section, which consists of a casting made, preferably, of brass, tubular in form, to adapt it to fit in the inlet branch of the trap, and having a flange 9, provided with perforations 10 to correspond with the perforated flange of the inlet branch of the trap. The discharge end of the valve-casing is cut off obliquely, forming an elliptical mouth or discharge-opening 11, at the upper edge of which a valve 12, which is likewise constructed of brass, is suitably hinged.

As will be seen by reference to Fig. 1 of the drawings, the discharge end of the valve-section 8 extends into the inlet branch of the trap, but not nearly to the bottom of the latter. This I consider a valuable feature of my invention, for the reason that the valve is thus kept clear from any solid obstructions which might choke it or interfere with its successful operation if the discharge-opening of said valve-section and the valve itself were extended nearly or quite to the bottom of the trap. The valve-section having been inserted into the inlet branch of the trap, the end of the inlet-pipe which projects beyond the flange 6, as shown at 26, is inserted into said valve-section, and the several parts are connected by bolts passing through the openings in the flanges 3, 6, and 9.

The trap is provided with an upwardly-extending branch 13, provided at its upper end with a flange 14, to which an upwardly-extending air-pipe 15 may be attached. The said air-pipe is provided with a seat 16 for a ball-valve 17, which is made of buoyant material, so that in case of water rising in the trap it will be floated to its seat and prevent water from backing up into the air-pipe. The latter may be connected with a chimney or other suitable ventilating-shaft.

The operation of this invention and its advantages will be readily seen from the foregoing description, taken in connection with the drawings hereto annexed. The valve-section is so constructed as to be readily applied to the ordinary traps now in use, and it will serve to effectually prevent water from backing through the trap as well as to prevent the escape of sewer-gas.

Having thus described my invention, what I claim, and desire to secure by Letters Patent of the United States, is—

1. The combination of a sewer-trap the inlet branch of which is provided with a perforated flange, the valve attachment, consisting of a tubular casing having an annular perforated flange, an obliquely-cut-off discharge-opening, and a valve hinged at the upper edge of the latter, the inlet-pipe having a flange near its end which is inserted into the casing of the valve attachment, and the connecting-bolts, substantially as set forth.

2. The combination of the trap having an upwardly-extending branch, the air-pipe connected with said branch and having a valve-seat and a buoyant ball-valve, the valve attachment mounted in the trap and having a hinged valve, and the inlet-pipe having its end extended into the valve-section, said inlet-pipe, valve attachment, and trap being connected by bolts passing through perforated flanges of the several parts, substantially as set forth.

In testimony that I claim the foregoing as my own I have hereto affixed my signature in presence of two witnesses.

FREDERICK DUANE CROWNER.

Witnesses:
 JNO. L. JACKSON,
 H. S. WHITMARSH.